T. W. FRECH, Jr.
MACHINE FOR TESTING INCANDESCENT LAMPS.
APPLICATION FILED DEC. 26, 1905.
922,123.
Patented May 18, 1909.
2 SHEETS—SHEET 1.
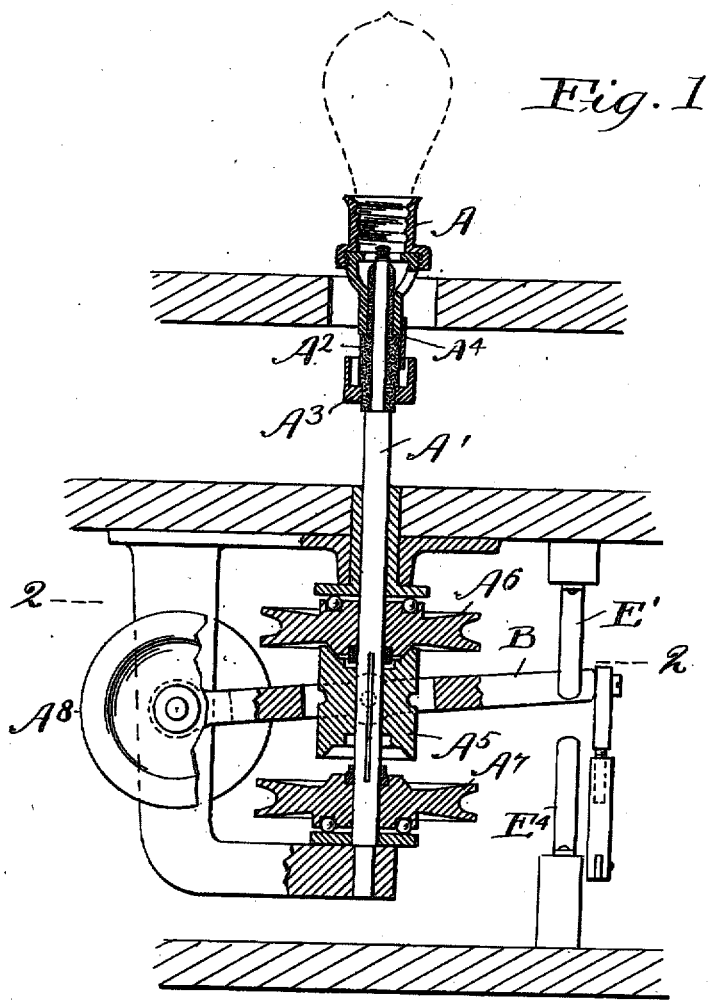
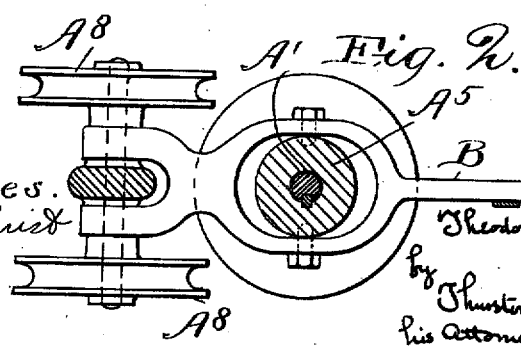
Witnesses.
E. B. Gilchrist
H. R. Sullivan
Inventor
Theodor W. Frech Jr.
by Thurston Bates & Woodward
his Attorneys T. W. FRECH, Jr.
MACHINE FOR TESTING INCANDESCENT LAMPS.
APPLICATION FILED DEC. 26, 1905.
922,123.
Patented May 18, 1909.
2 SHEETS—SHEET 2.
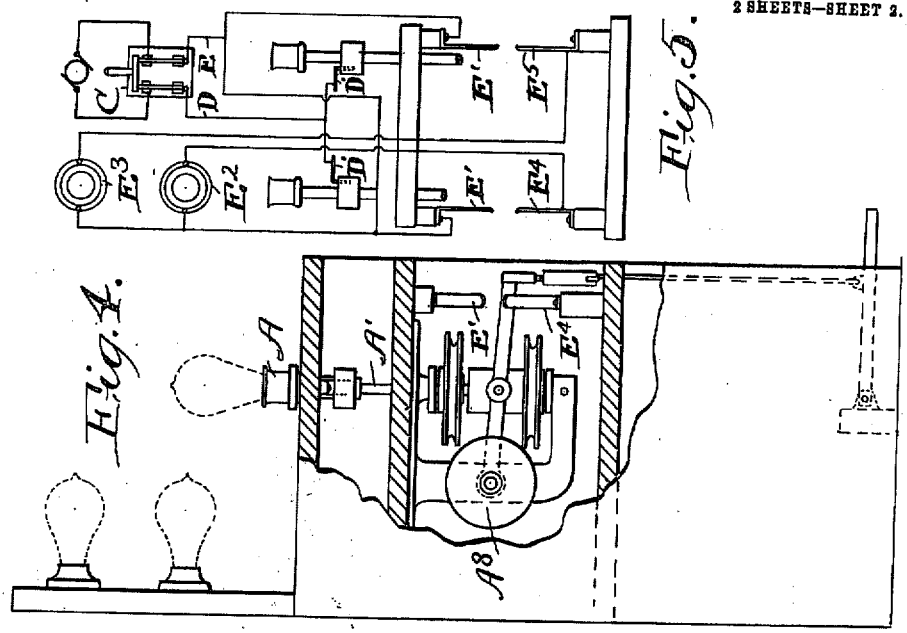
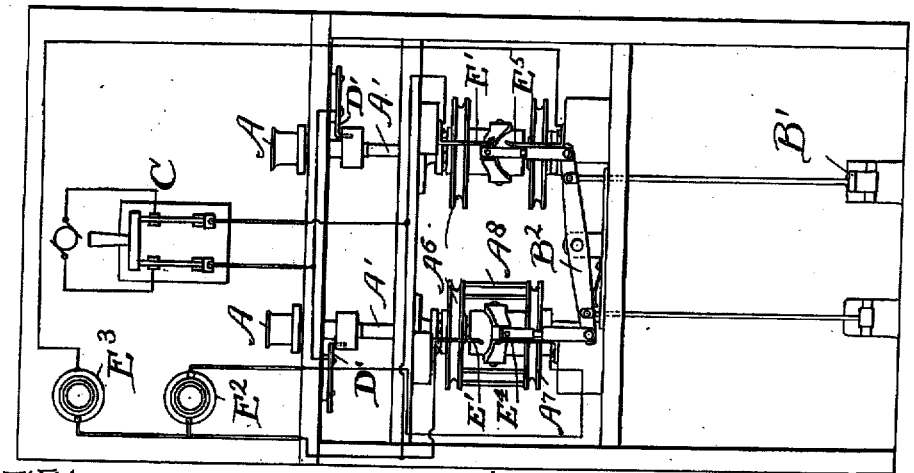
Witnesses.
E. B. Gilchrist
H. K. Sullivan
Inventor
Theodore W. Frech, Jr.
by
Thurston Bates Woodward
his Attorneys

UNITED STATES PATENT OFFICE.

THEODORE W. FRECH, JR., OF CLEVELAND, OHIO, ASSIGNOR TO NATIONAL ELECTRIC LAMP COMPANY, OF CLEVELAND, OHIO, A CORPORATION OF NEW JERSEY.

MACHINE FOR TESTING INCANDESCENT LAMPS.

No. 922,123.      Specification of Letters Patent.      Patented May 18, 1909.

Application filed December 26, 1905. Serial No. 293,397.

*To all whom it may concern:*

Be it known that I, THEODORE W. FRECH, Jr., a citizen of the United States, residing at Cleveland, in the county of Cuyahoga and State of Ohio, have invented a certain new and useful Improvement in Machines for Testing Incandescent Lamps, of which the following is a full, clear, and exact description, reference being had to the accompanying drawings.

The object of this invention is to provide a machine for testing the physical condition of incandescent lamps after the bulbs have been secured in their bases.

Testing as conducted with this apparatus is multifold in its character but is planned to ascertain, among other things, whether the filaments are perfect and free from weak spots. This test has heretofore been made by screwing the lamp bases into testing sockets by hand, a process which is exceedingly slow. An additional function of this machine is to test the rigidity of the bases,—any looseness being readily ascertained by feeding the lamps into the rapidly rotating socket and maintaining a slight pressure thereon with the hand. This machine further enables the operator to determine whether the bases have been properly applied to the bulb so that their axes are coincident with that of the bulbs,—any variation therefrom causing the lamp to wabble as the socket rotates. Finally, the mechanism is so arranged that in addition to the above tests, the operator's attention will be directed to any variation in voltage from the standard of the lot under inspection; but it must be clearly borne in mind that this is not a photometric proceeding and is merely intended to pick out stray lamps which have accidentally become mixed with a lot of lamps adapted to a different voltage.

Referring to the accompanying drawings, Figure 1 presents a vertical section of an operating rotatable testing spindle having a fixed permanent socket at its upper end. Fig. 2 is a horizontal transverse section taken on the line 2—2 of Fig. 1. Fig. 3 is a front elevation of the machine showing duplicate spindles mounted so as to be operated alternately. Fig. 4 is a side elevation partly broken away. Fig. 5 is a diagrammatic view showing the electric connections.

From Fig. 1, it will be seen that the receiving socket A is rigidly secured to a rotatable spindle A' and adapted to rotate therewith, but separated therefrom by suitable insulation $A^2$. A strip $A^4$ from the lower end of the receiving socket extends into a mercury cup $A^3$ carried by the spindle, and is also insulated therefrom so that current connection may be made with the socket by means of a terminal D' depending into the mercury cup,—see Fig. 5. The spindle has splined thereto a friction clutch $A^5$ adapted to be thrown into frictional engagement with either of two oppositely rotating pulley wheels $A^6$, $A^7$, which are driven by a rope or belt properly mounted on guide pulleys $A^8$ $A^9$. The mounting of the driving belt is not shown, as the manner and means of securing this opposite rotation is obvious and may be varied in any desired manner. The friction clutch is thrown upwardly or downwardly to engage the pulley wheels by means of a yoke lever B embracing the same and connected to foot treadles $B^7$ B'.

From Fig. 3 it will be seen that I have provided duplicate spindles, of the character described above, in which the respective friction clutches are connected by means of a walking beam $B^3$ with the effect of rotating the two spindles simultaneously in opposite directions. This is for the purpose of increasing the speed of manipulation since the operator is thereby enabled to utilize both hands,—one for holding a bulb to be screwed into its testing socket,—the other for holding a second bulb which is being removed from the second testing socket.

Referring to Figs. 3 and 5, it will be seen that when the current is thrown on by the controlling switch C, there is a constant feed into each mercury cup from one side D of the switch. The wire E from the other side of the switch is led to spring metal contacts E' E' adapted to bear against the ends of the yoke levers B as they are thrown upwardly, thus affording a lead for the current through the friction clutch to the spindle stem. This last mentioned wire E is also connected through two load lamps $E^2$ $E^2$ to spring metal contacts adapted to engage the yoke levers when they are drawn downwardly, and while the lamps are being screwed into their sockets. When the yoke lever is thrown down the socket is rotated in the direction to draw the lamp into the same and as soon as the lamp base reaches the limit of its movement a circuit is established through the wire D, the terminal D', the lamp under test, the spindle A', lever B, contact E⁴ or E³, load lamp E² or E³, and lead wire E. The voltage of the current being that for which the lamp is adapted and the current passing through the load lamp, in addition to the lamp under test, the result will be that the filament of the latter will, in the main, glow dully, while any weak or resistant spot therein will show up with noticeable brightness, enabling the operator to eliminate such defective specimens with great rapidity. While the lamp is being fed into the testing socket a slight pressure is maintained by hand and any looseness between the base and the bulb may be instantly felt. Further, the lamp bases being of necessity adapted to be fed into the testing socket so that their respective axes are coincident, it will follow that any inclination of the axis of the bulb to that of its base will cause the bulb to wabble drunkenly during the rotation of the spindle,—thus bringing to the notice of the operator those cases in which the base is "out of true" on the bulb. When the yoke lever is thrown upward, it will be seen that the current through the lamp under test will no longer flow through its corresponding load lamp, but will pass directly through the lead D, terminal D', socket A, the lamp itself, spindle A', the yoke lever B, contact piece E', and the lead wire E to the switch. This will throw the full current through the lamp as it is about to be removed from the testing socket. Should the particular lamp under test happen to be adapted to a greater or less voltage than the general lot of lamps being tested, the operator will, through the difference in the glow of the filament, immediately notice that fact and lay the lamp aside.

It is to be noted that where the above described operation is being carried on with one hand, a corresponding series of operations, half a phase behind, will be carried on with the other hand in the other testing socket.

It will be observed that the socket A is made in two parts so that the upper portion, which has the internal screw threads adapted to receive the ordinary Edison lamp base, may be removed, leaving the lower portion of the socket to perform the function of a contact ring when a Thomson-Houston type of base is employed. It will be noted that the upper end of the spindle is screw threaded for use with this latter type of base.

The receiving head formed by the annular ring and the separable socket, I shall designate in my claims as a head, intending this generic expression to cover the structure broadly whether the separable socket member be employed or omitted.

Having thus described my invention, I claim:

1. An apparatus for testing incandescent lamps comprising a rotatable head mounted on a spindle and insulated therefrom, means for rotating the head in opposite directions, a permanent electric connection for the head and movable means for effecting the reversal of rotation of the spindle connected with the spindle and adapted to engage an electric contact at a given point in its path.

2. An apparatus for testing incandescent lamps comprising a spindle carrying a friction clutch, rotatable connections therefor arranged in such manner that upon the shifting of the clutch the spindle may be rotated in a reverse direction, a head carried by said spindle and rotatable therewith but insulated therefrom, a mercury cup carried by said spindle below the head, means for shifting the clutch, and an electric contact positioned to engage a part of said shifting means.

3. An apparatus for testing incandescent lamps comprising a pair of receiving heads having terminal connections for establishing a circuit through an incandescent lamp when the lamp is placed therein, means whereby each of said heads may be rotated in both directions, means for controlling the direction of rotation of each head, and connections between said controlling means whereby the heads are simultaneously rotated, each in a direction opposite to that of the other.

4. An apparatus for testing incandescent lamps comprising a socket adapted to receive incandescent lamps and provided with an internal screw thread and mounted on a rotatable spindle, rotating means and clutch connection between said rotating means and the spindle adapted to be shifted and cause the spindle to rotate in either direction and means for automatically opening and closing the circuit through the lamp with the shifting of the reversing means.

5. An apparatus for testing incandescent lamps comprising a head and a spindle, rotating means, connection between the rotating means and the spindle, means for reversing the rotation of the spindle, electric connections adapted to pass different voltages to said head and spindle, and circuit closing contacts so located as to send a current of a certain voltage through the socket and spindle and any lamp in the head when the head is rotated in one direction, and to send a different voltage therethrough when the head is rotated in the opposite direction.

In testimony whereof, I hereunto affix my signature in the presence of two witnesses.

THEO. W. FRECH, Jr.

Witnesses:
B. L. BROWN,
M. F. BURNS.